Sept. 13, 1955   C. V. COLLINS   2,717,934
AUTOMATIC SWITCH CONTROLLING MECHANISM
Filed May 31, 1951   3 Sheets-Sheet 1

INVENTOR.
CHARLES V. COLLINS
BY
ATTORNEY—

Sept. 13, 1955  C. V. COLLINS  2,717,934
AUTOMATIC SWITCH CONTROLLING MECHANISM
Filed May 31, 1951  3 Sheets-Sheet 2
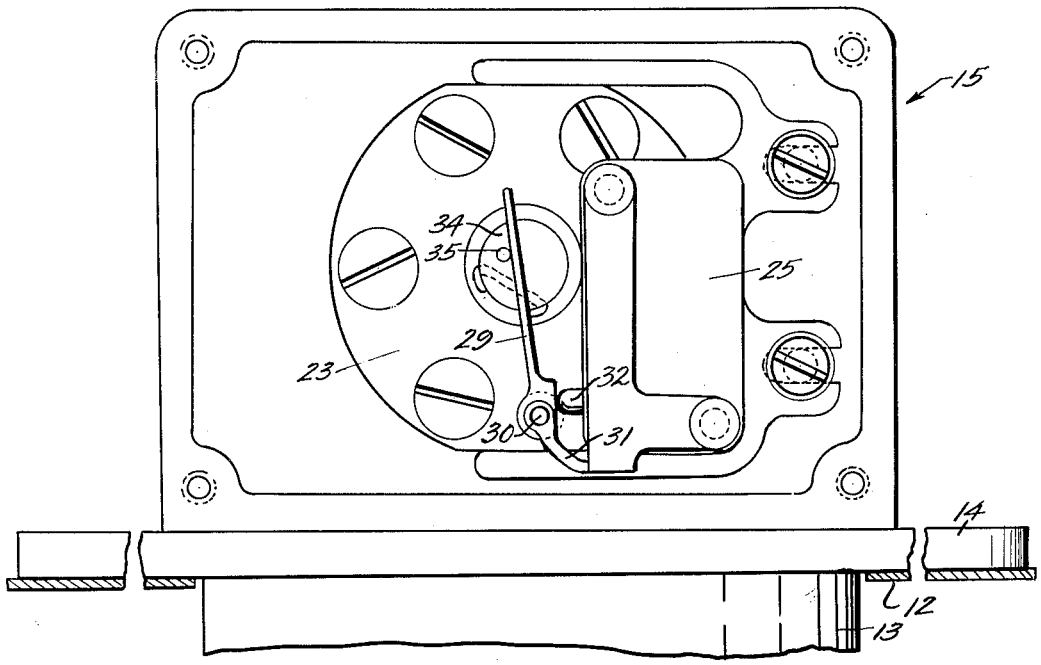
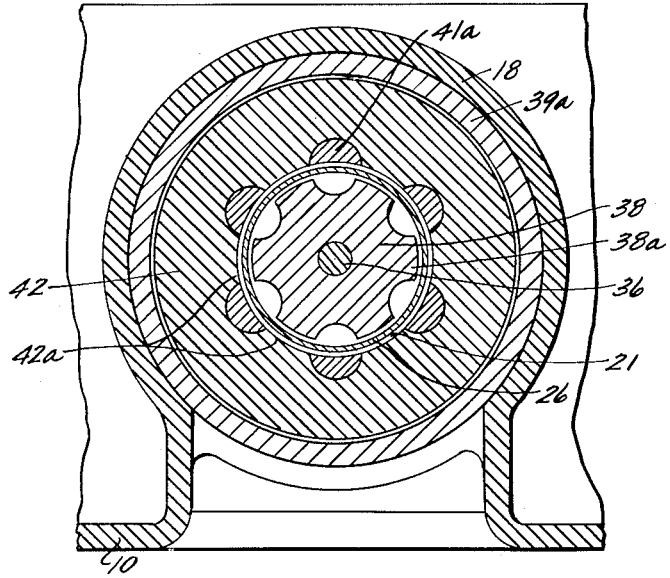
INVENTOR.
CHARLES V. COLLINS
BY
ATTORNEY Sept. 13, 1955          C. V. COLLINS          2,717,934

AUTOMATIC SWITCH CONTROLLING MECHANISM

Filed May 31, 1951          3 Sheets-Sheet 3

INVENTOR.
CHARLES V. COLLINS
BY

ATTORNEY

United States Patent Office 2,717,934
Patented Sept. 13, 1955

2,717,934

AUTOMATIC SWITCH CONTROLLING MECHANISM

Charles V. Collins, Dayton, Ohio

Application May 31, 1951, Serial No. 229,198

7 Claims. (Cl. 200—84)

This invention relates to an automatic switch controlling mechanism, and is designed primarily for controlling one of a series of switches which actuate the valves of a plurality of fuel tanks to successively connect the same with the engines of an aircraft, but is not limited to such use.

One object of the invention is to provide a simple and efficient magnetically driven switch actuating mechanism.

A further object of the invention is to provide such a mechanism which is operated by a float in a tank of liquid.

A further object of the invention is to provide such a mechanism in which the switch may be enclosed in a sealed chamber.

A further object of the invention is to provide such a mechanism comprising two magnets arranged on opposite sides of a non-magnetic wall of a switch chamber.

Other objects of the invention may appear as the apparatus is described in detail.

Figure 1:
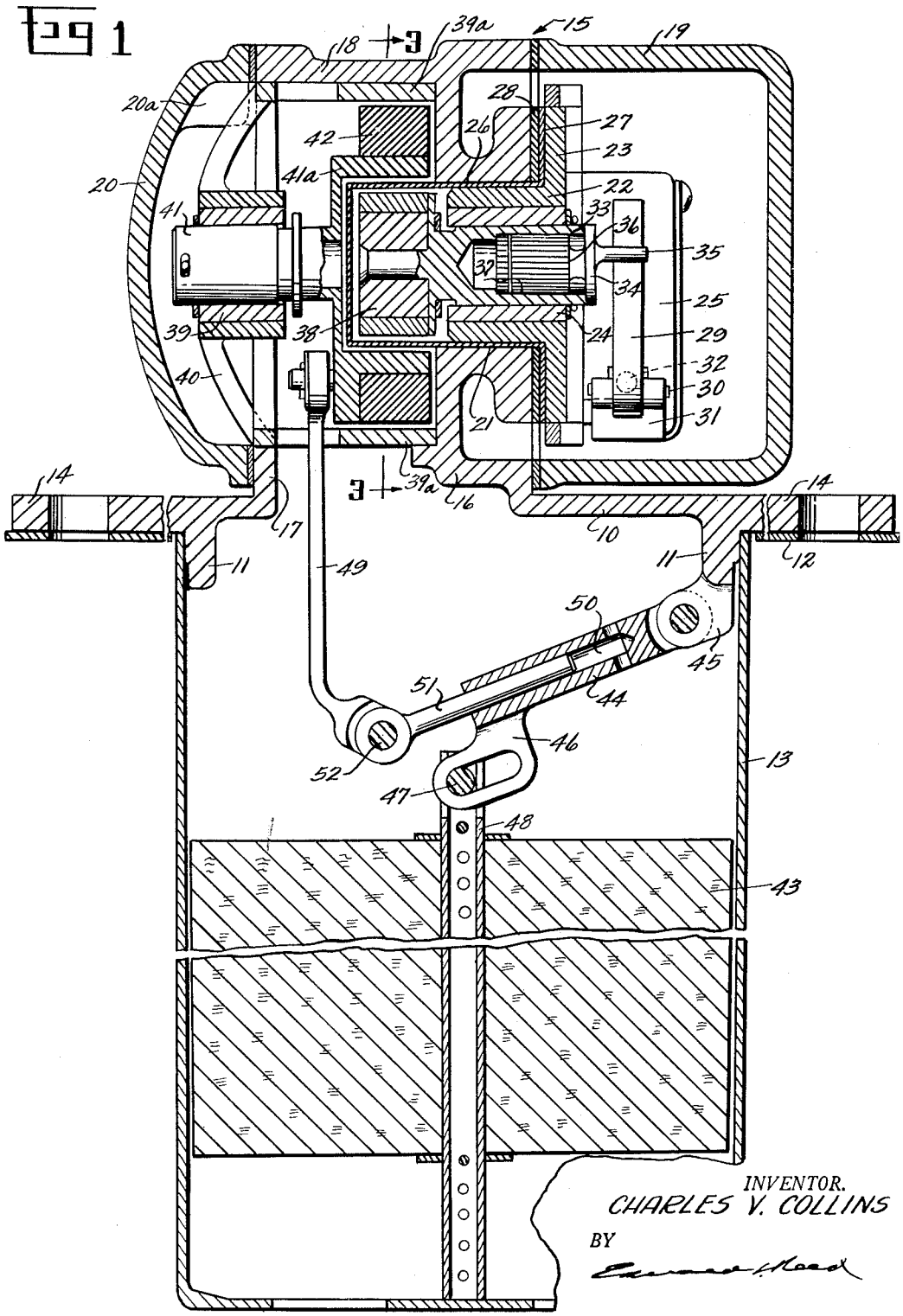
Figure 4:
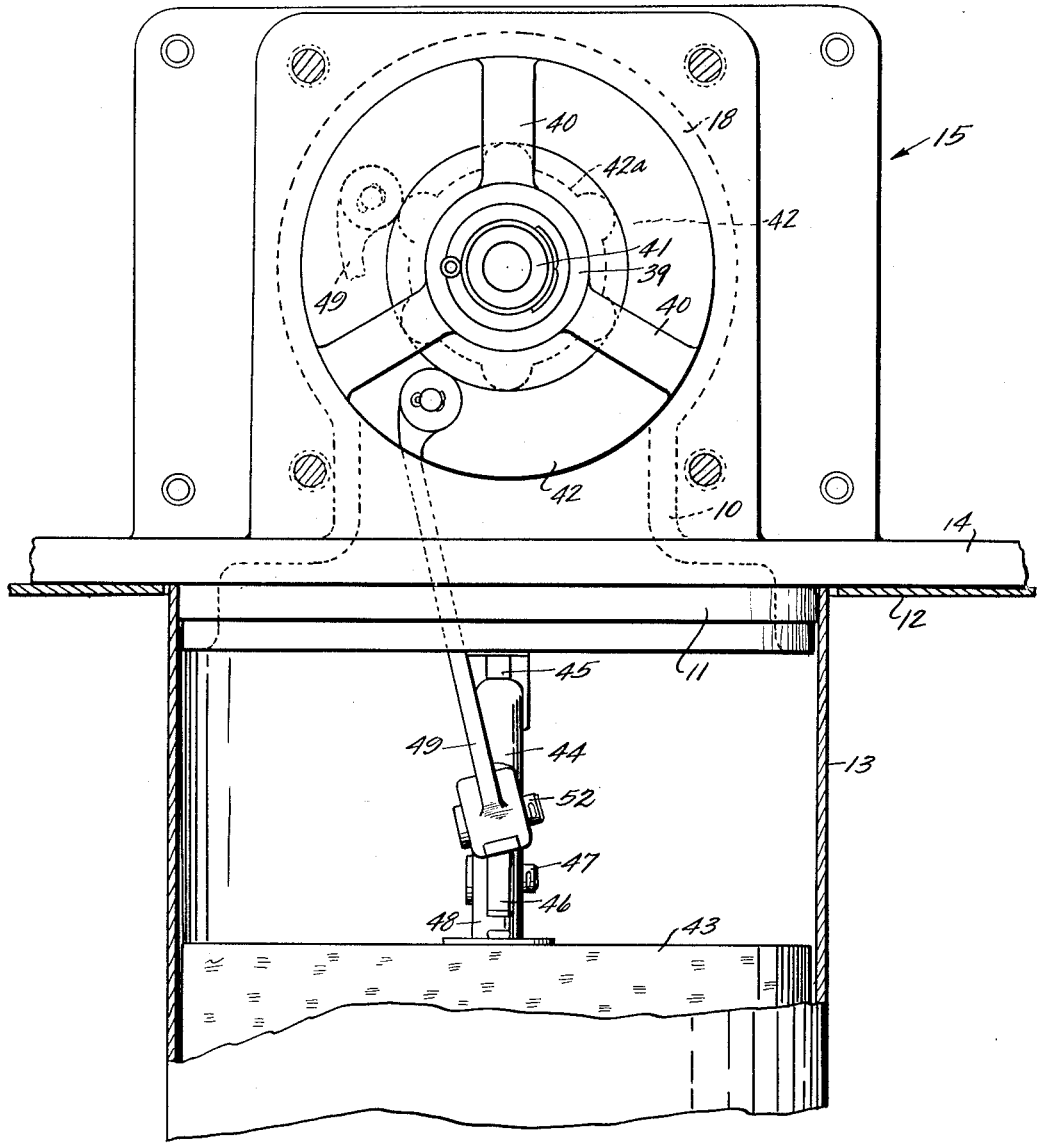

In the accompanying drawings Fig. 1 is a vertical section through a mechanism embodying the invention; Fig. 2 is an end elevation of the switch and its actuating device; Fig. 3 is a sectional view taken on the line 3—3 of Fig. 1; and Fig. 4 is a rear elevation of the apparatus, partly in section.

In these drawings I have illustrated one embodiment of the invention and have shown the same as designed for use with oil tanks. It is to be understood, however, that the mechanism as a whole, as well as the several parts thereof, may take various forms and may be used for various purposes without departing from the spirit of the invention.

In the form here illustrated, the apparatus comprises a structure 10 adapted to be mounted on a tank and having a depending flange 11 to extend through an opening in the top wall of the tank, a portion of which is shown at 12, and to support a float guide 13 therein. This structure is provided with apertured portions 14 overlying the tank and by which it may be attached to the tank. Supported on the base 10 is a casing 15 the intermediate portion of which comprises upright members 16 and 17 which are connected one with the other by a substantially cylindrical portion 18, the several parts being preferably cast in one piece. At one end, herein referred to as the forward end, the casing includes an end closure 19 substantially cylindrical in form, closed at its forward end and having rigid sealed connection with the adjacent upright member 16. The two members may be connected by bolts or in any suitable manner. At its rear end, the casing is closed by a concavo-convex member 20 which likewise has rigid sealed connection with the upright member 17.

The upright member 16 is provided with a central opening 21 to receive a bearing 22 which has at its forward end a radial flange 23 opposed to the forward face of the member 16. This bearing member is provided with a bearing surface 24 which is preferably of a non-magnetic material. The forward portion of the casing constitutes a switch compartment in which is mounted an electric switch 25 which may be of any suitable character. It is desirable that this switch chamber should be tightly sealed and for this purpose there is provided a non-magnetic sealing member, or wall, 26 having a cylindrical portion which extends through the opening in the upright member 16, a substantial distance beyond the same, and is closed at its rear end. At its forward end the cylinder is provided with a radial flange 27 which contacts the rear surface of the flange 23 of the bearing, and a sealing member 28 is interposed between the same and the adjacent surface of the member 16. Thus, the member 16, the wall 26, and gasket 28 combine to tightly seal the switch chamber. The switch is preferably provided with an arm 29 pivotally mounted at 30 on a bracket 31 and contacting a yieldable plunger 32 connected with one of the contact members of the switch. Journalled in the bearing 22 is a shaft 33 and rigidly secured to this shaft is a switch actuating member 34 which preferably comprises a pin 35 eccentric to the shaft and arranged to contact the arm 29 and move the same about its pivotal axis to actuate the switch. Preferably this pin 35 is rigidly secured to, or formed integral with, a head 36 which is fitted tightly in an axial bore 37 in the shaft. Also mounted on the shaft between the bearing and the closed rear end of the cylindrical wall 26 is a permanent magnet 38 having a series of poles 38a. This magnet is thus rotatably supported in a plane in the rear of the upright member 16.

The casing is provided at its rear end with a bearing 39 which in the present instance is supported by a series of arms 40 rigidly secured to an annular member 39a which is inserted in the rear portion of the casing and retained therein by a lug 20a on the end closure 20. Mounted in the bearing 39 is a shaft 41 having an enlarged, and preferably annular, inner end portion 41a which extends about the rear end portion of the non-magnetic cylindrical wall 26. Supported on the part 41a of the shaft is an annular permanent magnet 42 which is rotated by the shaft substantially in the plane of rotation of the magnet 38 in the cylindrical portion of the wall 26, and which is provided with a series of poles 42a to cooperate with the poles 38a of the magnet 38. The part 41a of the shaft may be connected with the magnet 42 in a suitable manner, as by casting. Both magnets are arranged close to the inner and outer surfaces respectively of the non-magnetic wall 26 but out of contact therewith and the lines of force of each magnet embrace the other magnet so that the two magnets are magnetically connected and the rotation of the outer magnet 42 will cause the inner magnet 38 to rotate therewith and thus rotate the actuating device 35 to actuate the switch.

Mounted in the float guide 13, or guided in any other suitable manner, is a float 43 which is supported on and moved by the liquid in the tank as the level of the liquid rises and falls. A crank arm 44 is pivotally mounted in the upper portion of the tank, preferably on a lug 45 carried by the part 11 of the base structure. Secured to the free end of this arm is a slotted bracket 46 through which extends a stud 47 rigidly secured to the upper end of the float, in the present instance, to the upper end of a tubular rod 48 which extends through the float and on which the float may be adjusted. Thus, as the float rises and falls, the arm 44 is moved about its pivotal axis. A pitman 49 pivotally connected at its upper end with the magnet 42 extends downwardly into the tank and is connected with the arm 44 for movement thereby. Preferably the connection between the pitman and the arm is slidable and as here shown the arm is provided with a longitudinal bore 50 in which slides a rod 51 which is pivotally connected at 52 with the lower end of the pitman 49. As the float rises or falls, the magnets are rotated and rotary movement is imparted to the switch actuating device 35 to actuate the switch and to open or close the valve. Ordinarily the lowering of the level of the fuel in the tank of an aircraft will open the outlet valve of another tank to connect the latter with the engine before the fuel of the first tank is entirely exhausted.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent is:

1. In an apparatus of the character described, a structure adapted to be mounted on a liquid tank, an electric switch supported on said structure, a permanent magnet rotatably mounted on said structure, a switch actuating device connected with said magnet for rotation thereby and supported in operative relation to said switch, said switch actuating device including an elongate pin member, a second permanent magnet supported on said structure for rotation about the axis of rotation of the first mentioned magnet in the plane of the first mentioned magnet and having an annular portion extending about and narrowly spaced from the first mentioned magnet, a circumferential wall of non-magnetic material interposed between and out of contact with said magnets, a float adapted to be supported in said tank and having guide means adjacent thereto for straight line movement by the rise and fall of the level of the liquid therein, and means actuated by said float for rotating said second magnet and thereby rotating the first mentioned magnet and said switch actuating device.

2. In a liquid level indicating switch device comprising a casing, a float, guide means attached to said casing slidably retaining the float in straight line movement, an arm pivotally attached to said casing and slidably attached to said float, said arm having a longitudinal bore therein, a rod slidably inserted within said bore, a magnetic coupling rotatably mounted within said casing, a lever pivotally attached to said rod and to said magnetic coupling, electric switch means mounted within said casing adjacent said magnetic coupling, and switch actuating means adjustably attached to said magnetic coupling.

3. In a liquid level indicating switch device, a housing adapted to be mounted on a liquid tank, an electric switch supported by said housing, magnetic coupling means rotatably mounted on said housing, a switch actuating device attached to said magnetic coupling means for rotation thereby and supported in operative relation to said switch, a float adapted to be supported in said tank for straight line movement by rise and fall of the level of the liquid therein, an arm pivotally attached to said housing and slidably attached to said float, a rod slidably inserted within said arm, and a lever pivotally attached to said rod and to said magnetic coupling means.

4. In a liquid level indicating switch device comprising a casing, a float, guide means slidably retaining the float in straight line movement, an arm pivotally attached to said casing, said arm having a longitudinal bore therein, a bracket having a slot attached to said arm, a rod slidably inserted within said bore, a pin attached to said float and slidably retained in the slot of said bracket, a magnetic coupling rotatably mounted within said casing, a lever pivotally attached to said rod and to said magnetic coupling, electric switch means mounted within said casing adjacent said magnetic coupling, and switch actuating means adjustably attached to said magnetic coupling.

5. In a liquid level indicating switch device comprising a casing, a float, guide means attached to said casing slidably retaining the float in straight line movement, an arm pivotally attached to said casing and slidably attached to said float, said arm having a longitudinal bore therein, a rod slidably inserted within said bore, a coupling rotatably mounted within said casing, a lever pivotally attached to said rod and to said coupling, electric switch means mounted within said casing adjacent said coupling, and switch actuating means adjustably attached to said coupling.

6. In a liquid level indicating switch device, a housing adapted to be mounted on a liquid tank, an electric switch supported by said housing, magnetic coupling means rotatably mounted on said housing, a switch actuating device attached to said magnetic coupling means for rotation thereby and supported in operative relation to said switch, a float adapted to be supported in said tank for straight line movement by rise and fall of the level of the liquid therein, an arm pivotally attached to said housing and to said float, and a lever pivotally attached to said arm and to said magnetic coupling means.

7. In a liquid level indicating device comprising a housing, a float, guide means attached to said housing slidably retaining the float in straight line movement, an arm pivotally attached to said housing and to said float, a magnetic coupling rotatably mounted within said housing, a lever pivotally attached to said arm and to said magnetic coupling, electric switch means mounted within said housing adjacent said magnetic coupling, and switch actuating means adjustably attached to said magnetic coupling.

References Cited in the file of this patent

UNITED STATES PATENTS

| | | |
|---|---|---|
| 1,572,807 | Price | Feb. 9, 1926 |
| 2,248,030 | Zwack | July 1, 1941 |
| 2,257,348 | Rickmeyer | Sept. 30, 1941 |
| 2,352,830 | Ford | July 4, 1944 |
| 2,356,652 | Connolly | Aug. 22, 1944 |
| 2,386,505 | Puchy | Oct. 9, 1945 |
| 2,620,412 | Ford | Dec. 2, 1952 |